United States Patent Office 3,846,300
Patented Nov. 5, 1974

3,846,300
WATER PURIFICATION
Kiyoshi Inoue, Tokyo, Japan, assignor to Inoue-Japax Research Inc., Yokohama, Japan
Filed Jan. 10, 1972, Ser. No. 216,423
Claims priority, application Japan, Jan. 11, 1971, 46/425; Feb. 24, 1971, 46/9,544
Int. Cl. C02c 5/12
U.S. Cl. 210—47
7 Claims

ABSTRACT OF THE DISCLOSURE

A water-purification method, system and article in which microporous, reticulate or cellular metallic bodies, consisting at least in major part of a metal adapted to form a flocculating agent in contaminated water, are introduced into the latter and are galvanically autosolubilized therein. The flocculant is thereupon separated from the water to produce a purified effluent.

1. FIELD OF THE INVENTION

My present invention relates to a method of purifying or decontaminating organically and/or inorganically contaminated water such as sewage and municipal, industrial or commercial effluent; the invention also relates to a system or apparatus for carrying out this method, i.e. for the purification of water, and to an article of manufacture for use in this method.

More particularly the present invention relates to water purification by flocculation over organic contaminants and/or precipitation or deposition of inorganic contaminants.

In terms of application, the invention relates to purification treatments of contaminated water or sewage and to an electrochemical system which can remove substantially all contaminants from waste or impure water and is useful in treating water of a water-supply system as well as the effluents previously mentioned, which may include the wastes of electroplating, metallurgical and chemical refining and like chemical or electrochemical processing plants.

2. BACKGROUND OF THE INVENTION

Among the methods of water purification which have been practiced heretofore, one may number filtration which is generally employed to remove contaminants of large particle size by entrapment in a filter bed, web or the like. For smaller particles, however, filtration is not practical, inasmuch as a small-pore filter is readily blocked and must be of a massive size to yield the necessary throughput. The use of ion-exchange resins for the removal of ionic contaminants has also been practiced, while the smaller particles, e.g. those which tend to be suspended in the liquid or are present therein in a dissolved state, are removed by adsorption, precipitation or flocculation. These latter processes may be generally described as "agglomerating techniques" inasmuch as the relatively small or colloidal particles are captured or recovered in the form of larger particles. The colloidally dispersed particles, which may be silicon oxides, metal-hydrolysis products and organic substances such as humic acid, are then coagulated according to these methods and removed as a flocculant by filtration, sedimentation or other macro-particle-recovery technique. Flocculation or coagulation is usually accomplished by incorporation in the water of one or more flocculating agents which generally are hydroxides of aluminum or iron generated in the liquid to be treated by the introduction of the corresponding soluble-metal salts.

The addition of flocculating agents in this manner is, of course, accompanied by the disadvantage that anions of the flocculating metals are introduced as contaminants or undesirable agents and are especially disadvantageous when the flocculating agent must be employed in large quantities. Attempts to overcome this difficulty by the electrochemical release of the flocculating metal, e.g. by anodic solubilization of aluminum against a cathode by the passage of an electric current from an external power supply through the system, have not proved to be fully satisfactory even though the rate at which the aluminum can be released is controllable in accordance with Faraday's law. This system has the disadvantage that high-power consumptions are characteristic, especially where the resistance of the liquid is low, and the electrodes connected to the external power supply, particularly the anode, tend to scale and lose efficiency with time. Of course efforts have been made to avoid such scaling or to remove the scale by polarity reversal or other techniques but these merely complicate the system and raise operation costs.

3. OBJECTS OF THE INVENTION

It is the principal object of the present invention to provide an improved water-treatment method for the clarification of contaminated water with increased efficiency, at reduced cost and in a simpler manner than has been possible heretofore.

Another object of the invention is to provide a system or apparatus for the purification of water whereby the aforementioned disadvantages can be obviated.

Still another object of the invention is to provide an article of manufacture adapted to be used in water-treatment processes and system which is capable, by such use, of reducing the water-treatment cost.

Still another object of my invention is to provide an improved method of purifying organically contaminated water, either the influent of a water supply system or network or the effluent or waste of industrial plants, institutions, municipalities or private homes which will increase the degree of decontamination for a given water-treatment cost over that of which is attainable by prior methods.

4. SUMMARY OF THE INVENTION

The foregoing objects and others which will be apparent subsequently are attained, in accordance with the present invention, through my surprising discovery that flocculating metals can be introduced into the liquid to be tested, usually contaminated water, in the form of galvanically autosoluble bodies consisting predominantly of the flocculating metals, preferably aluminum, and constituting a sacrificial element which, in contact with the water to be treated, releases the flocculating metal into the latter. The metallic body is thus constituted so as to dissolve *in situ* or galvanically in the water to form the hydroxide which constitutes the coagulant. The solubility of the body is independent of any application of electric current from an external source.

Preferably the metallic body contains aluminum in an amount in excess of 70% by weight and is conditioned for autosolubilization in the liquid by incorporating therein one or more additives or components other than aluminum so that the body has an elevated surface energy and is capable of functioning as a galvanic system or of dissolving *in situ* in the water within the external electric power mentioned earlier. The term "autosolubilization" as used herein, is intended to identify the chemical or galvanic dissolution of the metallic of the body in the water to be treated independently of the application of electric current from an external source, although I may apply an electric current in some cases as will be apparent hereinafter. The term "galvanic system" refers, of course, to an activated electrode system which, when contacted with an electrolyte or a contaminated liquid having a conductivity greater than that of pure water, generates an electromotive force sufficient to enable the body to dissolve itself, i.e. to autosolubilize in the liquid and form hydrolyzable ions therein.

According to an important feature of the present invention, the additives or other components of the predominantly aluminum body include magnesium, calcium, potassium, lithium, sodium, titanium, silicon, iron and carbon, individually or in combination and making up as much as 30% by weight of the predominantly aluminum body.

It is an important aspect of the invention, moreover, that the surface area to volume ratio of the body is augmented by the presence of pores therein. Advantageously, the porosity of the body is upward of about 50%, i.e. the ratio of void volume to total volume is at least 50%. The body may be produced according to the invention by casting a melt of the additives and aluminum at a temperature such that a hydride of a metal, e.g. one of the additive metals mentioned earlier, decomposes to produce the voids or pores. The pores, cells or voids of the body, moreover, should interconnect, i.e. constitute a reticulate structure wherein the pores intercommunicate, and the body should have an apparent specific gravity not exceeding 1 and preferably 0.7 or less. The hydride, which constitutes a foaming agent for the cast metal, is preferably titanium, tantalum, thorium or zirconium, thorium or zirconium hydride.

It is indeed surprising that, when a body of the type described is introduced in any form, e.g. as cakes, chips, particles, plates or shaped bodies conforming to vessel contours, into contact with the water to be treated, flocculation of colloidal particles takes place therein without contamination of the water with other ionic species. One observes a continued dissolution of the aluminum body and a consequent uninterrupted formation of aluminum hydroxide hydride $Al_2O_3 \cdot nH_2O$ which neutralizes silicate ion and other inorganic and organic macromolecular ions and charged particles and enables large-particle flocculants to form.

I have also observed that metal ions which are dissolved in the water and are lower in the galvanic series of elements (see page 667 of the Encyclopedia of Electrochemistry, Reinhold Publishing Co., N.Y. 1964) than aluminum and thus have lower ionic tendencies than that of aluminum or one of the other metal components of the porous body, tend to precipitate upon the body by ionic substitutions and are thus removed from the water. The additional components, which make up at most 30% by weight of the body, predominantly are the metals listed earlier and can be chosen for their effects in preventing passivation of the electrode surface, in moderating the dissolution rate, in lowering the electrode potential and in enhancing the galvanic generation of electric current per unit area of the body in contact with the water.

It has been found to be advantageous to incorporate a fluoride in the body to promote oxidation and flocculation of organic contaminants and hence the fluoride ion, provided in the form of sodium fluoride and calcium fluoride may make up the balance of the 30% by weight mentioned earlier.

I have already mentioned that the porous metallic bodies, which preferably consist of 70–98% by weight aluminum, may be used in any form. They may be employed as sacrificial vessels or as linings for such vessels, they may be provided as gas distributors or bubblers in flocculating tanks and the like, they may be used as electrodes in systems for the promotion of flocculation by the application of external electric power, and may be simply introduced as bodies into the water. Especially when the bodies have a low specific gravity as previously described, they may be used in the form of chips or cakes randomly distributed in and randomly displaced in a container through which the water is passed. The random movement may be generated by imparting vibration to the container or to a plate of the porous metal in contact with the water. They also may be used as a packing in a container forming a column through which the water is passed and can be combined with graphite or other carbon particles having an adsorptive activity.

Subsequent to, and frequently prior to treatment of the water with the porous metal bodies, it is advantageous to provide another treatment stage which may result in a product of higher clarity. To this end, the water introduced into the flocculating vessel may be preliminarily passed through a treatment zone in which randomly moving conductive particles are provided to act as auxiliary electrodes between a pair of spaced-apart electrodes across which an electric field is applied. These particles may be composed of carbon (adsorptive activated) or the porous metal, or both, and the porous metal may be used for one or both of the fixed electrodes connected to the external power source. This water-treatment arrangement may also be provided on the outlet side of the flocculation vessel and upstream or downstream of the initial separator at which a clarified effluent is recovered. Even in the absence of such conductive particles, an electric field may serve to promote separation of the flocculant from the water.

5. DESCRIPTION OF THE DRAWING

The above and other objects, features and advantages of the present invention will become more readily apparent from the following description, reference being made to the accompanying drawing in which.

6. SPECIFIC DESCRIPTION

Figure 1:
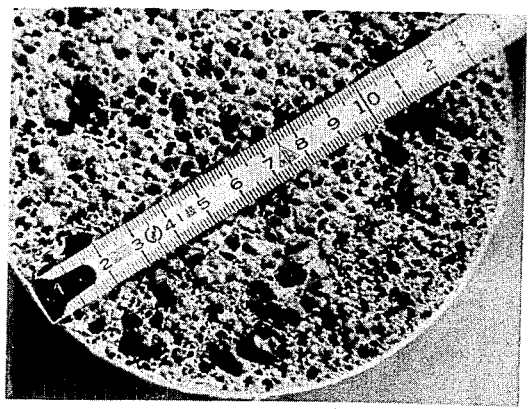
FIG. 1 is a photomicrograph of a portion of an aluminum-containing water purification body according to the present invention.

In FIG. 1, there has been illustrated by a photomicrograph a portion of the macroporous aluminum body which has a high void ratio and a reticular pore structure with intercommunicating pores. The body is made as described in Example I and can therefore be considered a foamed-aluminum body.

Figure 2:
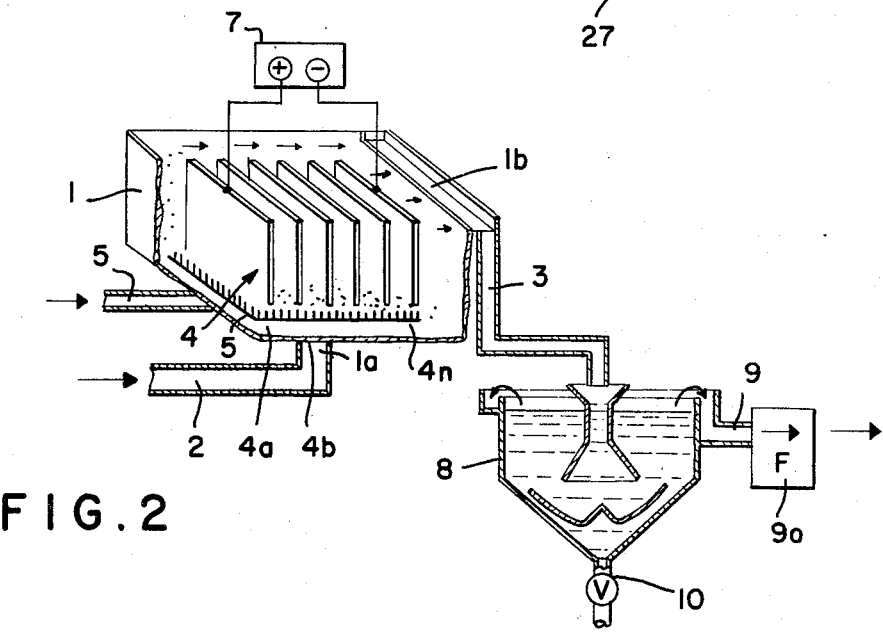
FIG. 2 is a diagrammatic perspective view, partly broken away and partly in section, of a water-purification system using the principles of the present invention.

FIG. 2 shows an apparatus for carrying out the treatment of the present invention, the apparatus comprising a treatment vessel or tank 1, which may be a conventional sewage treatment in which flocculation sedimentation and effluent decantation is carried out in a sewage-treatment plant. According to the present invention, the decontaminated water is introduced at one side of the tank at the bottom (via conduit 2 and opening in the bottom 1a of the tank) and flows upwardly to overflow or be decanted at the trough 1b. The trough is connected by a duct 3 with a settling and separating tank 8, as will be apparent hereinafter.

Within treatment vessel 1, there is disposed an array 4 of mutually parallel transversely spaced porous plates 4a, 4b . . . 4n, each of which is constituted by a galvanic body consisting predominantly of aluminum and constituted as described in the following Examples. Each of the plates thus has the described composition and porosity and may be connected to an external power source 7 which may be reversible periodically to prevent scaling. It should be noted that the electric power source 7 is not normally required and that, even where an electric current is applied and Faraday dissolution occurs at a rate determined by the current supplied by this external source, although solubilization proceeds for the reasons already described independently of the application of the external source. In the embodiment illustrated in FIG. 2, the terminal plates 4a and 4n of the array 4 are connected to the positive and negative terminal of the source 7 and form the anode and cathode respectively for anodic solubilization under the control of the external source. The remaining plates form intermediate electrodes or so-called bipolar electrodes and are unenergized. Thus the face of the plate 4b confronting the anode 4a assumes a relatively negative charge while its opposite face, turned in the direction of plate 4n, assumes a positive charge, each of the other intermediate electrodes constituting similar bipolar bodies. As a consequence, the faradic solubilization of the electrodes takes place in addition to galvanic or autosolubilization of the consumable metal bodies.

At the bottom of the tank 1, there is provided a bubbler 5, e.g. a perforated plate or a porous plate constituted of the consumable material of the present invention, through which a gas is released into the liquid to agitate the galvanically active region. The gas, which may be oxygen or air, may alternatively be introduced through the porous bodies of the array 4, and mix the hydroxides and ions in the region of galvanic solubilization to break up polarization and Helmholtz barriers and eliminate passivation of the exposed surfaces of the plates to promote flocculation. The bubbles also serve as carriers for the floc and promote oxidation and thereby facilitate decomposition of organic contaminants. The dynamic agitation provided at the active basis of the bodies reduces polarization, passivation and falling efficiency of the consumable bodies.

The treated liquid, generally carrying unsedimented portions of coagulated contaminants, is then introduced into the separation vessel 8 which may be a centrifugal separator or cyclone from which the dewatered sludge and salts are removed at 10 while the clarified effluent is recovered at 9. A filter 9a may be provided to remove any residual particles.

Figure 3:
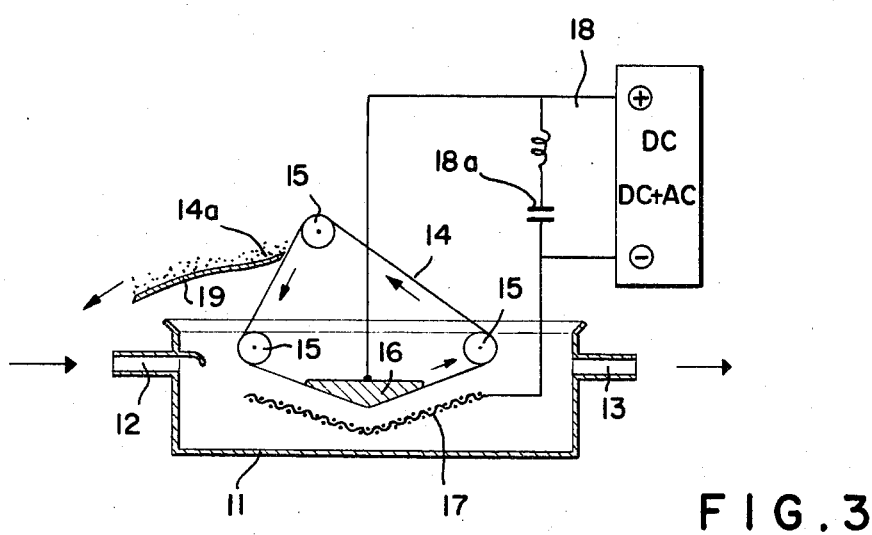
FIG. 3 is a diagrammatic elevational view of another apparatus for effecting water purification.

In FIG. 3, I have shown a dewatering vessel 11 whose inlet 12 may be connected with the outlet conduit 3 of the tank 1 or the outlet duct 9 of the solids-liquid separator 8 for further purification or with an effluent source having a high solids content. The solid-containing sludges may contain 98–99% by weight water and can be further dewatered using another principle of the present invention. More particularly, it has been found that the application of a direct-current field or a high-frequency alternating-current field, preferably superimposed upon a direct-current field, facilitates dewatering of flocculant sludges or suspense. A porous endless belt 14 is displaced by a motor not shown in the direction of the arrows and is guided around rollers 15 and along the underside of an electrode 16 of triangular cross-section. The electrode is received in the vessel 11 and is juxtaposed spacedly with a counter-electrode screen 17 connected to one terminal of the power supply represented at 18. The inlet to the vessel 11 is shown at 12 while the liquid outlet may be seen at 13. A resonant network 18a is connected across the output of the power supply. The application of direct current or alternating current of a frequency ranging from, say, 10 kHz. to 100 mHz., applied across the electrode 16 and 17 causes sludge and flocculant to deposit on the belt and enables the solids to be scraped off at 14a. The dewatered sludge is thus recovered on a chute 19 and the clarified water passes through outlet 13.

Figure 4:
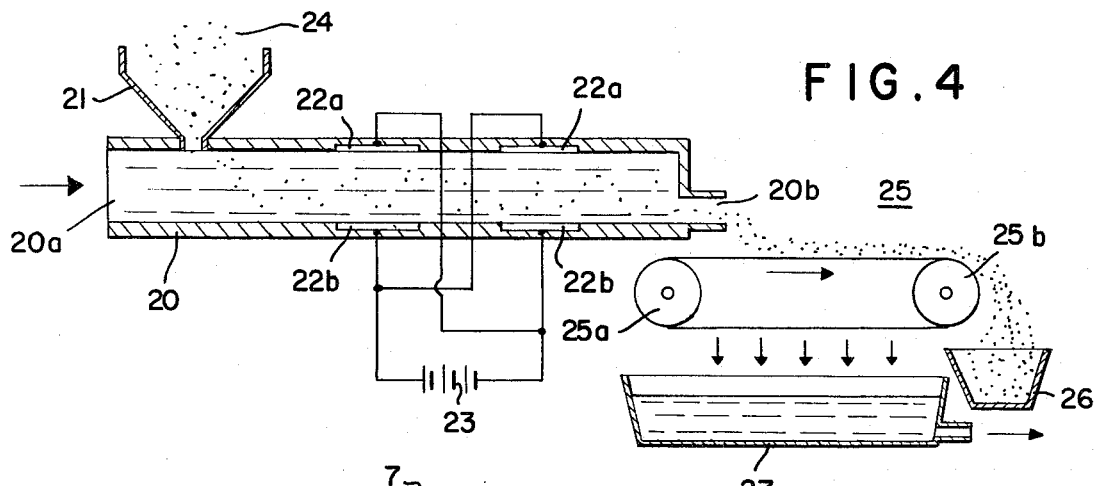
FIG. 4 is a diagrammatic cross-sectional view of a water-treatment system utilizing additional principles of the present invention.

FIG. 4 illustrates an embodiment of the invention which may be used for decontaminating waste water or sewage and also enables the solids to be obtained while producing water of high clarity. This arrangement may be employed downstream of the autosolubility arrangement described in FIG. 2 or the separator 8 or the further dewatering stage of FIG. 3 and may, if desired, be used upstream of the system of FIG. 2 and/or upstream of the system of FIG. 4. In this system, the contaminated water enters a treatment tube 20, composed of insulating material such as hard rubber, synthetic resin or metal lined with glass or a synthetic resin, via an inlet 20a. A hopper 21 is provided at an upstream location along this tube and dispenses carbon particles into the water stream.

Downstream of the hopper 21, but spaced rearwardly from the outlet 20b of the tube, there are provided opposing-electrode pairs 22a and 22b at axially spaced locations and connected to a power source so that diagonally opposite electrodes are at the same polarity. The power source 23, here shown to be a battery, may apply direct current or high-frequency alternating current superimposed upon the direct current.

The carbon particles are capable of adsorbing both organic and inorganic components by physical adsorption and chemisorption and, in addition, function as randomly moving auxiliary electrodes in the liquid to promote electrochemical reactions which operate upon the adsorbed materials and any contaminants remaining in the liquid. The reactions involve oxidation and electrochemical degradation of organic systems, adsorption and coagulation of decomposed products and substantially nonreversible precipitation of metal ions. It appears that some of the water is electrolyzed to generated oxygen and hydrogen gases around the individual carbon particles and the oxygen thus available attacks the organic contaminants and provides available oxygen to reduce both BOD and COD (oxygen-demand) values. The presence of carbon particles also reduces the capacitor requirements of the power supply and I am able to employ a relatively low-voltage power supply and yet ensure stabilized electrolysis even after the conductivity has been markedly reduced.

The carbon particles should have particle sizes of 0.5 to 3 mm. and are admixed in an amount of 10 to 15% by volume relative to the liquid treated. An agitating means of any conventional design, e.g. adapted to vibrate the tube 20 or a stirrer therewithin, may be used to maintain random movement and spacing of the carbon particles. The latter are preferably composed of activated carbon but may be graphitic or nongraphitic particles. A porous aluminum component, e.g. the autosolubility bodies mentioned earlier may also be introduced into the liquid stream in the form of particles or flakes.

The liquid and the particles entrained thereby, including carbon particles which have adsorbed contaminants, are discharged onto a liquid-permeable endless belt 25c at the solids/liquid separator station 25. The belt passes over rolls 25a and 25b and is driven by a motor not shown to discharge the solids into a container 26 from which the carbon particles may be returned to hopper 24. The purified water percolates through the belt and is collected in a receptacle 27. Some or all of the water may be recirculated through the tube 20 for further clarification or supplied to the vessel 1 of FIG. 2 for further treatment. At least one of the electrodes 22a or 22b may be constituted from the galvanically soluble porous bodies described earlier.

7. SPECIFIC EXAMPLES

Example I

An aluminum alloy in a molten state having 10% by weight magnesium receives in the course of cooling from a temperature above its melting point 660° C., 3% by weight of titanium hydride $TiH_4$ which is decomposable at a temperature of 600° to 650° C., the hydride being encapsulated in an aluminum foil. The alloy is agitated sufficiently as the hydride thermally decomposes or volatilizes to generate hydrogen gas therein, until the alloy begins to solidify at a temperature of 600° to 610° C. The photograph in FIG. 1 shows in a cross-sectional view the highly porous body prepared according to the above combined casting and foaming process.

Example IA

The foamed aluminum body prepared in Example I which has an apparent specific gravity of 0.4 is divided into disk-shaped cakes each having a thickness of 0.5 cm. and a diameter of 14 cm. The cakes are used as galvanic bodies and immersed in sewage in an amount of 8 grams per liter of the latter. The sewage of pH=6.3 initially has a BOD content of 40 p.p.m., an oil content of 18 p.p.m., a copper content of 35 p.p.m. and a cadmium content of 15 p.p.m. but, after treatment for 3 hours with the cakes merely immersed therein, these contaminant values are reduced to: a BOD content of 8 p.p.m., an oil content of 12 p.p.m., a copper content being trace and a cadmium content of 1 p.p.m. The copper and cadmium are found mostly as precipitated upon the cakes as a result of ionic-substitution reaction with the metals of the cakes and the rest of the removed contaminants are found as in the form of flocculant and sludge which are settled.

Example IB

The foamed aluminum body prepared in Example I is divided into chips having an average size of 1 cm. in diameter. The chips are used for the treatment of the same nontreated sewage and in the essentially same manner as in Example IA and at a proportion of 5 grams per liter of the sewage. The treatment for 2 hours results in purification which substantially corresponds to the result of Example IA but here the transparency of the water is increased with the extinction of the blue color due to copper ions.

Example II

An aluminum alloy which is prepared in the same manner as in Example I but contains 3% by weight calcium fluoride in addition to 10% by weight magnesium, the body is divided into cakes. When the nontreated sewage as of Example IA is treated with these cakes, the BOD content and oil content are reduced to 2 p.p.m. and 3 p.p.m., respectively. The amount of cakes for use with respect to the volume of the sewage to achieve this result for 2 hours is enough to be as low as 3 grams/liter. When the treatment time is as long as 50 hours, the proportion of the cakes required with respect to the sewage volume can be reduced as low as 50 mg./l.

Example III

A sewage with a turbidity of 3, a pH of 6.8, a BOD content of 15 p.p.m. and a COD content of 10 p.p.m. is treated with cakes prepared which are divided from a cast aluminum alloy containing 3% by weight magnesium, 7% by weight calcium, 10% by weight silicon and 3% by weight iron foamed by addition of 3% by weight titanium hydride to have an apparent specific gravity of 0.45. The cakes are immersed in the sewage at a proportion of 5 grams/l. and the sewage is continuously agitated. After treatment for 3 hours, the water has a turbidity of 9, a pH of 6.8, a BOD content of 2 p.p.m., and a COD content of 1.2 p.p.m.

Galvanic bodies according to the present invention are also highly effective to detoxicate water containing cyanic compounds and ions. It is observed that the following reactions take place electrochemically at the galvanic interfaces:

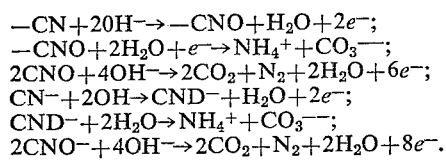

Example IV

An effluent from a plating plant, of pH=6.8 and a tempearture of 20° C. and containing a cyanide content of 15 p.p.m., a copper content of 8 p.p.m., a zinc content of 5 p.p.m. and a chromium content of 5 p.p.m., is treated with cakes divided from an aluminum cast alloy containing 4% by weight silicon, 2% by weight iron and 3% by weight calcium fluoride and foamed by addition of 3% by weight titanium hydride in the manner noted previously, the foamed body having an apparent specific gravity of 05. The cakes are added to the effluent at a proportion of 3 g./l. After one hour, the effluent has a cyanide content of 1 p.p.m., a copper content of 0.2 p.p.m., a zinc content of 3 p.p.m. and a chromium content of 0.1 p.p.m. Metal content, is generally reduced to 100 p.p.m. by conventional techniques, can be brought practically to zero by the present system.

Example V

An aluminum alloy containing 2% by weight silicon, 2% by weight calcium fluoride and 1% iron is cast and foamed by addition of a metal hydride as previous example, the foamed body having a volume increased by four times over cast volume. Plates cut from the foamed body are immersed in a treatment vessel as in FIG. 2 which receives an effluent from a plating plant and air is supplied in the region of these bodies at a rate of 15 liters/min. as the galvanic plates dissolves in situ without an external power source. The effluent has, prior to the treatment a cyanide content for 15 p.p.m., a copper content of 8 p.p.m., a zinc content of 5 p.p.m., a chromium content of 5 p.p.m. and a oil content of 2%, but after 60 minutes of treatment, has a cyanide content of 0.6 p.p.m., a copper content of 0.1 p.p.m., a zinc content of 0.5 p.pm., a chromium content of 0.2 p.p.m. and no detectable oil trace. The temperature and pH of the liquid are 20° C. and 6.4, respectively.

Example VI

An aluminum-hydroxide solution containing 97% by weight water is passed through a direct-current field of 245 volts which is applied across a pair of electrodes having a gap width of 55 mm., with the belt arrangement as generally shown in FIG. 3. A deposit is formed upon the belt at a rate of 7.5 kg./kwh. and contains 14% by weight water and the balance being solid containing 83.7% by weight $Al_2O_3$, 7.2% by weight $Fe_2O_3$, 0.2% by weight copper, 0.6% by weight cadmium, 0.7% by weight $SiO_2$ and 0.3% by weight $TiO_2$. When a high-frequency alternating-current filed of a peak-to-peak potential of 800 volts and a frequency of 1 mHz. is superimposed upon the direct-current field, the rate of deposition is reduced by ⅓.

Example VII

An effluent from an industrial plant is passed at a rate of 16 liters/min. through a treatment tube having a diameter of 50 mm. and provided along its interior wall with a pair of iron electrodes each having a conductive surface of 10 mm. x 1000 mm. (elongated in the direction of length of the tube), the electrodes being juxtaposed across the flow of the effluent. Graphite particles of particle size ranging between 0.5 to 3 mm. in diameter are mixed with the effluent at a proportion of 40% by volume and an electric current of 25 amperes is applied at a voltage of 15 volts between the electrodes. The effluent has initially a BOD content of 300 p.p.m., an oil content of 26 p.p.m., a cyanide content of 34 p.p.m., a copper content of 30 p.p.m. and a cadmium content of 15 p.p.m. and has after the treatment of BOD content of 35 p.p.m., an oil content of 8 p.p.m., a cyanide content of 0.2 p.p.m. and copper and cadmium content being trace.

The water recovered at container 27 is desirably fed to treatment vessel 1 of FIG. 2, for flocculation treatment. When this is done, the water of Example VII has an oil content reduced as trace.

In the system of FIG. 4 it is found desirable to form at least one of electrodes 22a and 22b from a porous, galvanic body defined previously so that combined and synergistic effects of these two functions are obtained advantageously.

I claim:

1. A method of treating impure water containing agglomeratable solids, comprising the steps of introducing into the water at least one flocculating agent by galvanically autosolubilizing a metal forming said agent from a porous body disposed in contact with the water to produce a flocculant, said body consisting at least 70% by weight of aluminum, the balance being predominantly a component selected from the group which consists of magnesium, calcium, sodium, lithium, potassium, titanium, iron, silicon, carbon and combinations thereof; separating said flocculant from the water, said body being cast from a melt having a thermally decomposable hydride incorporated therein, the hydride being thermally decomposed to form voids in the body and the body being permitted to cool to retain the voids therein, said body being disposed in contact with the water between a pair of electrodes; and applying an electric current across said electrodes to promote solubilization of said body in said water.

2. The method defined in claim 1 wherein said body consists predominantly of a metal having a higher ionic tendency than a metal contained in the water whereby the metal contained in the water is precipitated upon said body by ionic substituion.

3. The method defined in claim 1 wherein said body further comprises fluorine.

4. The method defined in claim 1 wherein said body has a specific gravity of at most 1.

5. The method defined in claim 5 wherein said body has a porosity of at least 50%.

6. The method defined in claim 1 wherein the water is further treated by introducing conductive particles into the water and passing the water with the conductive particles distributed therein between a pair of electrodes across which an electric potential is applied.

7. The method defined in claim 1 wherein the water is further treated by passing it through an electric field to deposit flocculant upon a surface and withdrawing the flocculant on said surface from the water.

References Cited
UNITED STATES PATENTS

| | | | |
|---|---|---|---|
| 3,676,071 | 7/1972 | Speed | 75—20 FX |
| 3,586,627 | 6/1971 | Gooch | 210—47 |
| 3,549,423 | 12/1970 | Grubb et al. | 75—20 F |
| 3,523,891 | 8/1970 | Mehl | 210—47 X |
| 2,751,289 | 6/1956 | Elliott | 75—20 F |
| 566,324 | 8/1896 | Kendrick | 204—150 |
| 1,514,737 | 11/1924 | Smith | 204—149 X |
| 2,397,831 | 4/1946 | Bellamy | 210—510 X |
| 2,194,781 | 3/1940 | Andrus | 204—149 |
| 1,222,637 | 4/1917 | Landreth | 210—47 X |

FOREIGN PATENTS

| | | | |
|---|---|---|---|
| 27,559 | 1907 | Great Britain | 204—149 |
| 490,795 | 8/1938 | Great Britain | 210—510 |

SAMIH N. ZAHARNA, Primary Examiner

R. H. SPITZER, Assistant Examiner

U.S. Cl. X.R.

204—149